United States Patent
Sylvia

(10) Patent No.: US 7,406,836 B2
(45) Date of Patent: Aug. 5, 2008

(54) VEHICLE MISTING SYSTEM AND METHOD THEREFOR

(76) Inventor: Harry A. Sylvia, 10207 N. 51st Dr., Glendale, AZ (US) 85302

( * ) Notice: Subject to any disclaimer, the term of this patent is extended or adjusted under 35 U.S.C. 154(b) by 1232 days.

(21) Appl. No.: 10/684,892

(22) Filed: Oct. 14, 2003

(65) Prior Publication Data

US 2005/0076664 A1    Apr. 14, 2005

(51) Int. Cl.
*F28D 5/00*    (2006.01)
(52) U.S. Cl. .............................. 62/304; 62/239; 62/310
(58) Field of Classification Search .............. 62/121, 62/239, 304, 310, 314
See application file for complete search history.

(56) References Cited

U.S. PATENT DOCUMENTS

| | | | |
|---|---|---|---|
| 5,046,449 A | 9/1991 | Nelson | |
| 5,373,703 A | 12/1994 | Pal | |
| 5,613,371 A | 3/1997 | Nelson | |
| 5,724,824 A * | 3/1998 | Parsons | 62/171 |
| 6,112,538 A * | 9/2000 | Strussion | 62/304 |
| 6,151,907 A * | 11/2000 | Hale | 62/314 |
| 6,325,302 B1 | 12/2001 | Guzowski et al. | |
| 6,389,835 B1 | 5/2002 | Uranga | |
| 6,471,194 B2 | 10/2002 | Keeney | |

OTHER PUBLICATIONS www.mist-ified.com.

* cited by examiner

*Primary Examiner*—Melvin Jones
(74) *Attorney, Agent, or Firm*—Jeffrey D. Moy; Weiss & Moy, P.C.

(57) ABSTRACT

A misting system for a vehicle having a water pump uses a connector for splicing into a water line of the vehicle. A valve is coupled to the connector for activating and deactivating the misting system. Opening the valve causes pressure in the water line to be lessened thereby causing the water pump to activate and supply more water to the water line. A filter is coupled to the valve for removing particulates from the water in the water line. Piping is coupled to the filter. The piping will have watertight quick connect/disconnect connectors for quickly assembling the piping. Misting nozzles are coupled to the piping for spaying a fine mist of water in the air.

15 Claims, 2 Drawing Sheets

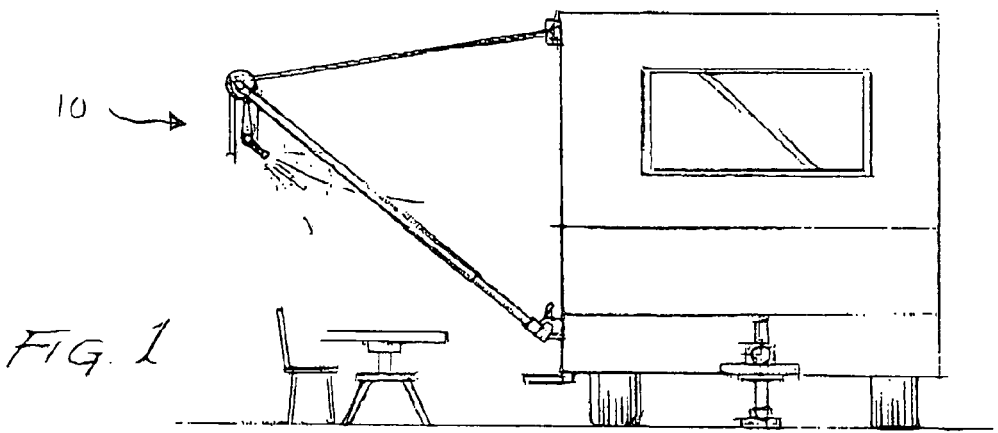
FIG. 1
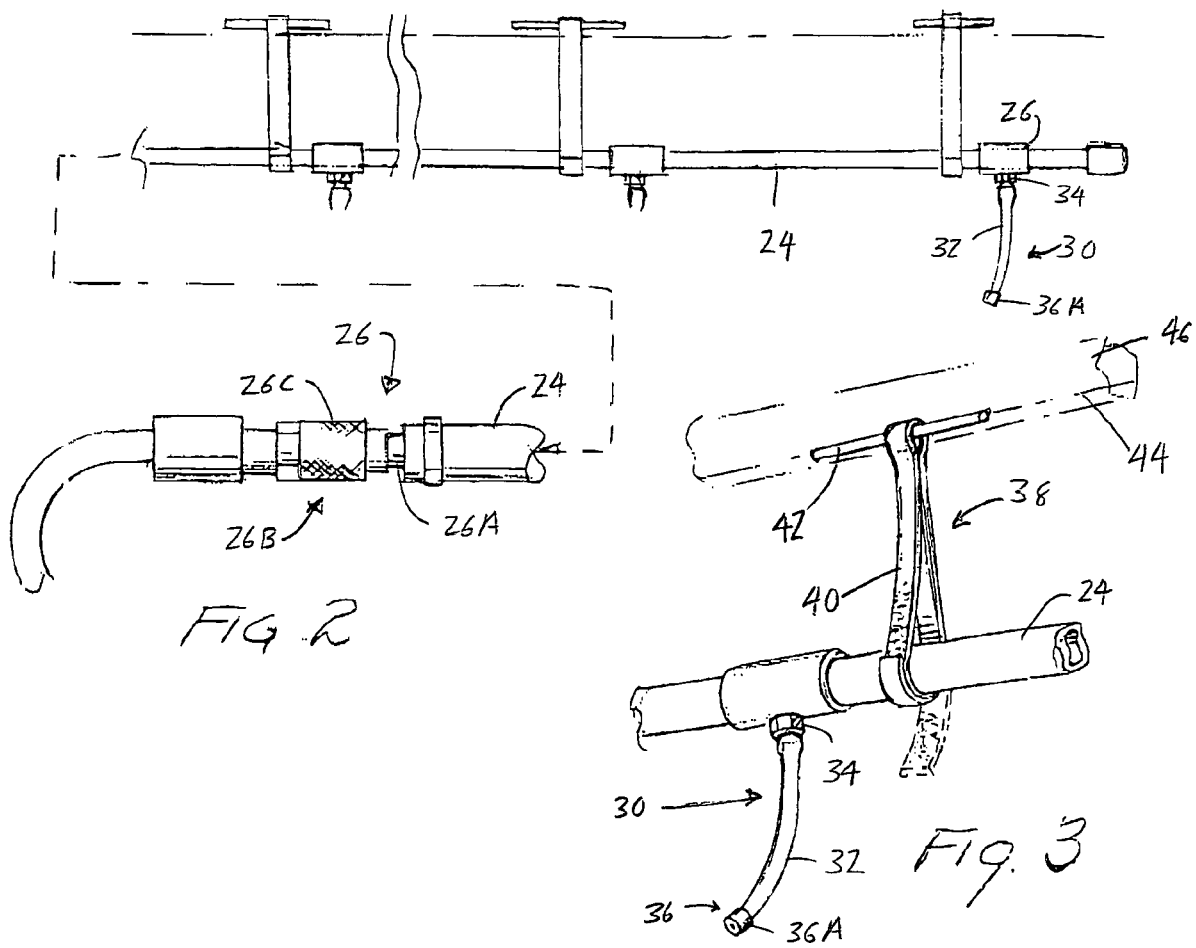
FIG. 2
FIG. 3

VEHICLE MISTING SYSTEM AND METHOD THEREFOR

BACKGROUND OF THE INVENTION

1. Field of the Invention

This invention relates generally to a misting system and, more specifically, to a misting system which can be installed on any existing vehicle which has a water pump.

2. Description of the Prior Art

Many people like to spend their free time in the outdoors. Camping, boating and the like have become extremely popular outdoor activities. People are spending more and more money on recreational vehicles, trailers/campers, boats, and the like. The problem is that hot climates can make outdoor activities unbearable. What's the use of going camping or boating if the hot weather causes some people to stay in the RV or boat all day long.

For those people who are willing to bear the heat and go outside during the heat of the day, some relief can be obtained by finding shade to avoid direct sunlight. But even finding shade may be insufficient, especially if the temperature in the shade is 100 degrees F. or higher.

Some people have been using misting systems as a way to stay cool when outside. People have been installing misting systems on there patio as a way to cool off while enjoying the ability to be outdoors on their patio. A misting system works by produces a fine mist of water. The mist is sprayed into the air and enhances evaporative cooling of the skin.

Some people have installed misting systems on golf carts as a way to cool off while golfing in hot weather. U.S. Pat. Nos. 6,389,835 and 5,613,371 both disclose misting systems for golf carts. While these systems do work, they have several problems associated with them. The main disadvantage of these systems are that they are too expensive to install. The main reason for their expense is due to the fact that these systems require a new water pump and a new water storage reservoir since golf carts are not equipped with these items. Another problem with these systems are that they are difficult to install. A golf cart must be completely retrofitted for a misting system to be installed. There are presently no misting systems which can easily be installed on a golf cart.

Presently, there are no misting systems for recreational vehicles, campers, trailers, boats, or any other type of vehicle. Even if the above patents could be modified to be used on the above vehicles, the misting system would still suffer from the same disadvantages.

Therefore, a need existed to provide an improved misting system. The improved misting system must overcome the problems associated with the prior art. The improved misting system must be cheaper and easier to install on a vehicle than prior art misting systems.

SUMMARY OF THE INVENTION

In accordance with one embodiment of the present invention, it is an object of the present invention to provide an improved misting system.

It is another object of the present invention to provide an improved misting system that overcomes the problems associated with the prior art.

It is another object of the present invention to provide an improved misting system that is cheaper and easier to install on a vehicle than prior art misting systems.

BRIEF DESCRIPTION OF THE EMBODIMENTS

In accordance with one embodiment of the present invention, a misting system for a vehicle having a water pump is disclosed. The misting system uses a connector for splicing into a water line of the vehicle. A valve is coupled to the connector for activating and deactivating the misting system. Opening the valve causes pressure in the water line to be lessened thereby causing the water pump to activate and supply more water to the water line. A filter is coupled to the valve for removing particulates from the water in the water line. Piping is coupled to the filter. The piping will have watertight quick connect/disconnect connectors for quickly assembling the piping. Misting nozzles are coupled to the piping for spaying a fine mist of water in the air.

In accordance with another embodiment of the present invention, a method of installing a misting system for a vehicle having a water pump is disclosed. The method comprising: splicing into a water line of the vehicle; installing a connector into the spliced water line; coupling a valve to the connector for activating and deactivating the misting system, opening the valve causing pressure in the water line to be lessened causing the water pump to activate and supply more water to the water line; coupling a filter coupled to the valve for removing particulates from the water in the water line; coupling piping to the filter, the piping coming in sections wherein the piping has watertight quick connect/disconnect connectors for quickly assembling the piping; and coupling misting nozzles to the piping for spraying a mist of water in the air.

The foregoing and other objects, features, and advantages of the invention will be apparent from the following, more particular, description of the preferred embodiments of the invention, as illustrated in the accompanying drawings.

BRIEF DESCRIPTION OF THE DRAWINGS

The novel features believed characteristic of the invention are set forth in the appended claims. The invention itself, as well as a preferred mode of use, and advantages thereof, will best be understood by reference to the following detailed description of illustrated embodiments when read in conjunction with the accompanying drawings.

FIG. 1 is an elevated perspective view of the misting system of the present invention installed on a trailer.

FIG. 2 is a front view of the misting system showing the quick connect/disconnect valves.

FIG. 3 is an elevated perspective view of the hanging device used in the misting system of the present invention.

DETAILED DESCRIPTION OF THE PREFERRED EMBODIMENT

Figure 4:
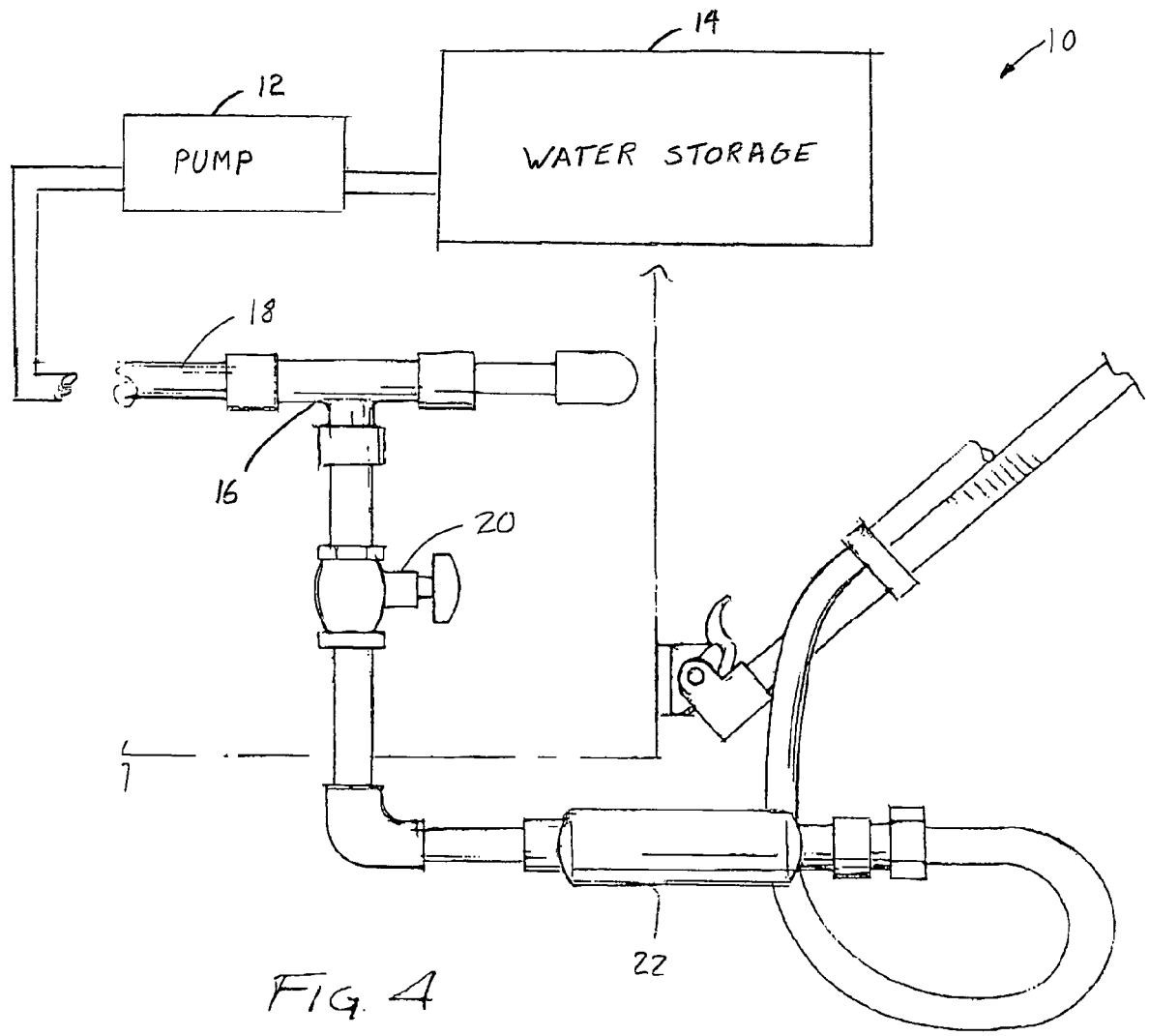
FIG. 4 is a front view of the T-valve and filter used in the misting system of the present invention.
Figure 5:
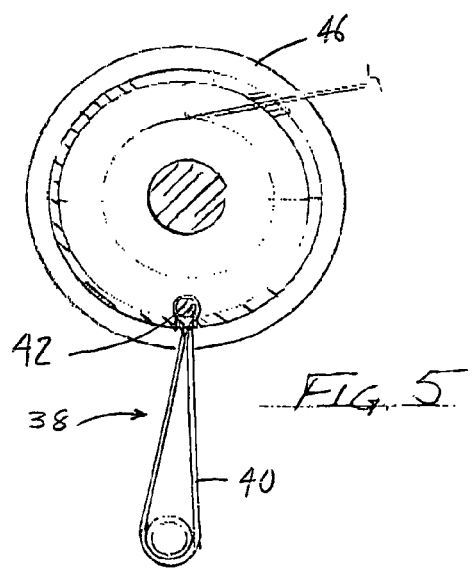
FIG. 5 is a cross-sectional view showing one embodiment of how the hanging device may be installed.

Referring to the Figures, a misting system 10 is shown. The misting system 10 is to be used on any type of vehicle that already has a water pump for circulation water throughout the vehicle. Vehicles such as a recreational vehicle (RV), a trailer/camper, a boat, or the like. These vehicles generally have a water pump 12 which is coupled to a water storage container 14. The water pump 12 and water storage container 14 are used to circulate fresh clean water to sinks; bathroom facilities like a shower, tub, and/or toilet; and other like devices located within the vehicle.

The misting system 10 uses a T-line connector 16. The T-line connector 16 is spliced into the water line 18. The water line 18 is used to carry water from the water storage container 14 to the different devices in the vehicle which requires water (i.e., sinks, shower or tub, toilet, etc.). A valve 20 is in fluid communication with the T-line connector 16. The valve 20 is used to turn on and off the misting system 10. When the valve 20 is turned to the ON position, water will flow from the water line 18 to the misting system 10. When the valve 20 is turned to the OFF position, water will be prevented from flowing to the misting system 10.

A filter 22 is coupled to the valve 20. The filter 22 is used to remove any sediment or other impurities from the water supply that may clog the misting system 10. Any type of filter 22 may be used. However, a filter 22 that is able to remove very small impediments is better since this type of filter 22 will best prevent the misting system 10 from becoming clogged.

Piping 24 is coupled to the filter 22. The piping 24 is used to transport the water to the misters 26. Some type of flexible conduit 26 may be used to couple the filter 22 to the piping 24. However, the piping 24 may be directly coupled to the filter 22 as well. The piping 24 is generally run around the awning of the trailer/RV. The piping 24 should be positioned above the head of individuals so that the mist is sprayed into the air above the individuals in order to enhance evaporative cooling of the skin. In accordance with one embodiment of the present invention, the piping is ½" PVC piping. However, this should not be seen as to limit the scope of the present invention.

In order to quickly install the piping 24, the piping will come in sections. The piping 24 may come in different size sections. In order to connect consecutive sections of the piping 24 together, quick connect/disconnect connectors 26 are used. The quick connect/disconnect connectors 26 provide a water tight seal between consecutive sections of the piping 24. The quick connect/disconnect connectors 26 is comprised of a male 26A and a female 26B connectors. The female connector 26B will have an outer shell 26C which can be pulled back. The male connector 26A is then inserted into the female connector 26B and the outer shell 26C moves forward locking the male connector 26A and the female 26B connector together. The male 26A and female 26B connectors will form a water tight seal between consecutive sections of the piping 24.

The piping 24 will have openings 28 spaced along the length of each piping section 24. The openings 28 have a gasket so that water will not leak out of the openings. Mister nozzles 30 are inserted into the openings 28. When properly inserted into the openings 28, the mister nozzles 30 will open the gasket allowing water to flow to the mister nozzles 30. If no mister nozzle 30 is inserted into the opening 28, the gasket will prevent water from leaking out of the opening 28.

In accordance with one embodiment of the present invention, the mister nozzle 30 is comprised of a flexible tubing 32. The flexible tubing 32 will allow one to bend and rotate the mister nozzle 30 to any position. On one end of the tubing 32 is a connector 34. The connector 34 will allow the mister nozzle 30 to be coupled to the opening 28. On the other end of the tubing 32 is a spray nozzle 36. The spray nozzle 36 will have an adjustable head 36A. The adjustable head 36A will allow one to control how fine a mist is sprayed from the spray nozzle 36.

Hanging connectors 38 are provided to coupled the piping 24 to the vehicle. The hanging connectors 38 are comprised of a strap member 40. The strap member 40 is coupled to a hanging wire 42. In operation, the hanging wire 42 is inserted into a channeling 44 formed in a tubing 46 where the awning 48 is extended from. The hanging wire 42 will securely hold the hanging connectors 38 within the tubing 46. The piping 24 is then placed inside the strap member 40.

The misting system 10 operates in the following manner. The T-line connector 16 is spliced into the water line 18. The valve 20 and the filter 22 are then coupled to the T-line connector 16. Whenever the misting system 10 is to be installed, the piping sections 20 are coupled together using the quick connect/disconnect connectors 26 and hung on the vehicle using the hanging connectors 38. The mister nozzles 30 are then coupled to the piping 24. The water pump 12 of the vehicle monitors the pressure in the water line 18. When the valve 20 is opened, pressure in the water line 18 will drop. The water pump 12 will activate drawing water from the water storage container 14 and sending the water through the water-line 18 and to the piping 24. The water will then be expelled through the mister nozzles 30. It should be noted that on a boat, the water pump 12 may have a line which can be placed in the water of the lake/ocean. Thus, the water pump 12 may be able to draw water from the lake/ocean instead of the water storage container 14.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A misting system for a vehicle having a water pump comprising:
   a connector for splicing into a water line of the vehicle;
   a valve coupled to the connector for activating and deactivating the misting system, opening the valve causing pressure in the water line to be lessened causing the water pump to activate and supply more water to the water line;
   a filter coupled to the valve for removing particulates from the water in the water line;
   piping coupled to the filter, the piping coming in sections wherein the piping has watertight quick connect/disconnect connectors for quickly assembling the piping; and
   misting nozzles coupled to the piping for spraying a mist of water in the air.

2. A misting system for a vehicle having a water pump in accordance with claim 1 further comprising a hanging device for holding the piping above heads of individuals using the misting system.

3. A misting system for a vehicle having a water pump in accordance with claim 1 further comprising flexible hosing coupled to the filter and the piping for coupling the filter to the piping.

4. A misting system for a vehicle having a water pump in accordance with claim 1 wherein the quick connect/disconnect connectors comprises:
   a male connector; and
   a female connector wherein the female connector has a moveable outer shell which is retracted when the male connector is inserted into the female connector, the outer shell moving forward locking the male connector and the female connector together and forming a water tight connection.

5. A misting system for a vehicle having a water pump in accordance with claim 1 wherein the misting nozzles comprises:
   a water tight connector for coupling the misting nozzles to the piping;

flexible tubing having a first end coupled to the water tight connector wherein the flexible tubing can be bent to a desired position; and a nozzle head coupled to a second end of the flexible wherein the nozzle head is adjustable to control the amount of water dispersed by the nozzle head.

6. A misting system for a vehicle having a water pump in accordance with claim 2 wherein the hanging device comprises:

a hanging wire for coupling the hanging device to the vehicle; and a strap member coupled to a hanging wire for supporting and holding the piping above the heads of individuals using the misting system.

7. A misting system for a vehicle having a water pump comprising:

a connector for splicing into a water line of the vehicle;

a valve coupled to the connector for activating and deactivating the misting system, opening the valve causing pressure in the water line to be lessened causing the water pump to activate and supply more water to the water line;

a filter coupled to the valve for removing particulates from the water in the water line;

piping coupled to the filter, the piping coming in sections wherein the piping has watertight quick connect/disconnect connectors for quickly assembling the piping wherein the quick connect/disconnect connectors comprises:

a male connector; and a female connector wherein the female connector has a moveable outer shell which is retracted when the male connector is inserted into the female connector, the outer shell moving forward locking the male connector and the female connector together and forming a water tight connection;

misting nozzles coupled to the piping for spraying a mist of water in the air wherein the misting nozzles comprises:

a water tight connector for coupling the misting nozzles to the piping;

flexible tubing having a first end coupled to the water tight connector wherein the flexible tubing can be bent to a desired position; and a nozzle head coupled to a second end of the flexible wherein the nozzle head is adjustable to control the amount of water dispersed by the nozzle head; and a hanging device for holding the piping above heads of individuals using the misting system.

8. A misting system for a vehicle having a water pump in accordance with claim 7 further comprising flexible hosing coupled to the filter and the piping for coupling the filter to the piping.

9. A misting system for a vehicle having a water pump in accordance with claim 7 wherein the hanging device comprises:

a hanging wire for coupling the hanging device to the vehicle; and a strap member coupled to a hanging wire for supporting and holding the piping above the heads of individuals using the misting system.

10. A method of installing a misting system for a vehicle having a water pump comprising:

splicing into a water line of the vehicle;

installing a connector into the spliced water line;

coupling a valve to the connector for activating and deactivating the misting system, opening the valve causing pressure in the water line to be lessened causing the water pump to activate and supply more water to the water line;

coupling a filter coupled to the valve for removing particulates from the water in the water line;

coupling piping to the filter, the piping coming in sections wherein the piping has watertight quick connect/disconnect connectors for quickly assembling the piping; and coupling misting nozzles to the piping for spraying a mist of water in the air.

11. The method of claim 10 further comprising coupling a hanging device to the vehicle for holding the piping above heads of individuals using the misting system.

12. The method of claim 10 further comprising coupling flexible hosing to the filter and the piping for coupling the filter to the piping.

13. The method of claim 10 wherein assembling the piping using the quick connect/disconnect connectors comprises:

providing a male connector; and providing a female connector wherein the female connector has a moveable outer shell which is retracted when the male connector is inserted into the female connector, the outer shell moving forward locking the male connector and the female connector together and forming a water tight connection.

14. The method of claim 10 wherein coupling the misting nozzles comprises:

providing a water tight connector for coupling the misting nozzles to the piping;

providing flexible tubing having a first end coupled to the water tight connector wherein the flexible tubing can be bent to a desired position; and providing a nozzle head coupled to a second end of the flexible wherein the nozzle head is adjustable to control the amount of water dispersed by the nozzle head.

15. The method of claim 11 wherein the hanging device comprises:

a hanging wire for coupling the hanging device to the vehicle; and a strap member coupled to a hanging wire for supporting and holding the piping above the heads of individuals using the misting system.

* * * * *